No. 748,094. PATENTED DEC. 29, 1903.
H. C. PARKER.
DEVICE FOR MEASURING OPENINGS.
APPLICATION FILED MAR. 20, 1902.
NO MODEL.
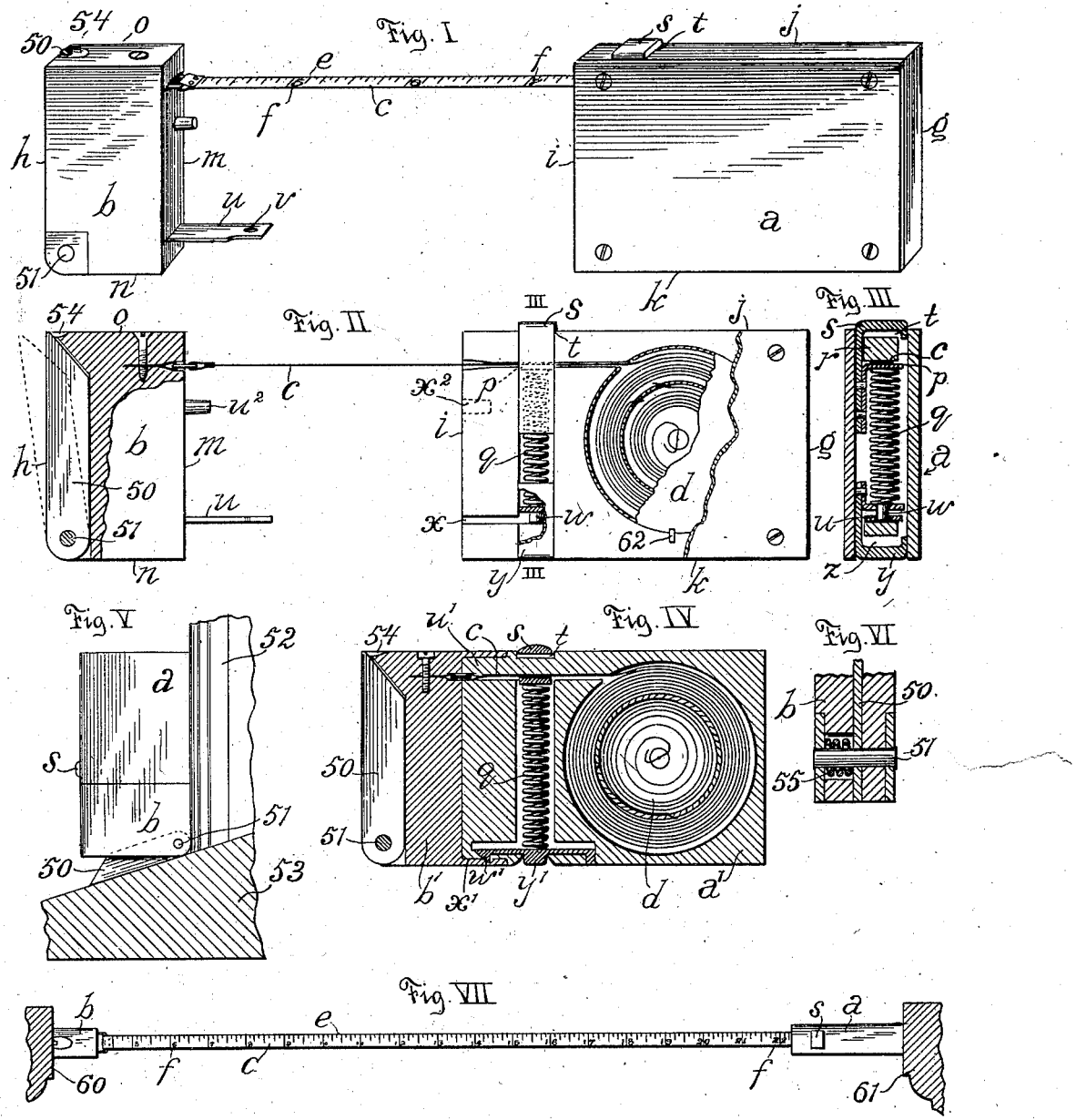
Witnesses
C. C. Holly
J. Townsend.
Inventor
Herbert C. Parker
by Townsend Bros.
his Attys.

No. 748,094. Patented December 29, 1903.

UNITED STATES PATENT OFFICE.

HERBERT C. PARKER, OF LOS ANGELES, CALIFORNIA, ASSIGNOR TO HIPOLITO SCREEN AND SASH COMPANY, OF LOS ANGELES, CALIFORNIA, A CORPORATION OF CALIFORNIA.

DEVICE FOR MEASURING OPENINGS.

SPECIFICATION forming part of Letters Patent No. 748,094, dated December 29, 1903.

Application filed March 20, 1902. Serial No. 99,174. (No model.)

*To all whom it may concern:*

Be it known that I, HERBERT C. PARKER, a citizen of the United States, residing at Los Angeles, in the county of Los Angeles and State of California, have invented a new and useful Device for Measuring Openings, of which the following is a specification.

An object of this invention is to provide convenient means for measuring window and door openings for the purpose of fitting screens, sashes, &c.

This invention is applicable for taking other measurements, but is especially adapted for measuring spaces between two bodies.

An object of the invention is to provide a small device which may be carried in the pocket and which may be employed to accurately and readily measure the distance between two surfaces.

An object of the invention is to adapt the same for accurately measuring the distance between two straight parallel surfaces, such as the casing or jams of window-openings, and to so construct the device that it serves this purpose in the most convenient and ready manner.

A further object of the invention is to provide a superior construction for an automatic tape control, which may be applied at slight expense inside the tape-holding case and will prevent the tape take-up from taking up the tape except when the controlling device is released.

The accompanying drawings illustrate the invention.

Figure I is a perspective view of a device embodying this invention, the members being drawn apart to expose the locking-arm and a portion of the measuring-tape. Fig. II is a longitudinal mid-section of the same. Fig. III is a sectional view on line III III, Fig. II. Fig. IV is a longitudinal mid-section of another form of the invention. Fig. V is an elevation of the device in use for measuring angles between the stop and sill of a window. Fig. VI is a fragmental sectional detail illustrating the joint of the try-bevel. Fig. VII is a plan of the device on a smaller scale, the tape being drawn out to show that the numbers are applied thereon consecutively to designate the length in a regular succession of small units of measurement.

The device comprises two members $a$ and $b$, a measuring-tape $c$, which connects said members and is made fast to one member, being controlled by a take-up device $d$ in the other member, and which tape is marked with a numbered scale $e$, the numbers $f$ on which are arranged with reference to the tape-holding member $a$, which is provided with a take-up device to exhibit at said tape-holding member the number of the scale which designates the space between the external ends $g$ $h$ of said members, respectively. The members $a$ $b$ are desirably rectangular and are constructed with corresponding faces, as at $m$ and $i$, to fit together to form a unitary rectangular body, and the measuring-tape which connects said member extends between said corresponding faces, so that when the members are drawn apart and set with their opposite ends $g$ $h$ in contact with parallel straight surfaces the tape may in great precision be put into exact position for measuring between said parallel faces.

The numbers $f$ and the markings of the scale are to be read at the inner end $i$ of the member $a$, which carries the take-up device. The ends $g$ $i$ and the edges $j$ $k$ of one member are arranged in a rectangle, and the ends $h$ $m$ and edges $n$ $o$ of the other member are likewise in a rectangle, so that when drawn apart and the ends $g$ and $h$ are brought firmly against parallel faces the tape $c$ will extend to indicate the exact distance between said faces. Said external ends $g$ and $h$ are preferably each provided with a flat surface, so that the device may be quickly extended against the sides of the opening to be measured without the impact bruising plastering or marring the finish of woodwork. In order to provide for accurately and readily determining the space measured and for holding the measurement until the same can be noted, the member $a$, which is furnished with the take-up device $d$, is furnished with a catch $p$ to normally engage and stop the tape to hold the same relative to the member *a* against extension or retraction. Said catch is formed as a rigid member the arms of which embrace the tape together with a portion of the tape-holding member. This sort of catch, it will be seen, has no relatively moving parts liable to get out of place or wear by frictional contact with each other. *q* designates a spring to actuate said catch *p* to press the tape *c* against a portion *r* of the member *a*, thus to frictionally hold the tape relative to the member *a* against movement in or out. The object of frictionally holding the tape with relation to the member which has the take-up device is to secure perfect accuracy in measuring the opening.

*s* designates a thumb-piece or manually-accessible portion connected with the catch *p* and extending into an opening *t* in the member *a* to be operated by the thumb or finger of the hand which may be holding the member *a*, whereby when it is desired to release the tape the same may be readily done.

*u* designates a locking-arm extending from the member *b* and provided with a catch *v* to be engaged by a locking member *w*, which is movably mounted in the member *a* and is actuated by resilient means, which may be the spring *q*, to engage the catch *v* when the arm *u* is inserted in a socket *x*, provided in the member *a* to receive the same.

*y* designates a thumb-piece connected with the locking member *w* and extending in an opening *z* in the member *a* to be manipulated for releasing the arm *w*. The tape *c* is arranged near one edge of the members, and the locking-arm and socket therefor are near the other edge of said member, so that when the members are brought together the locking-arm when locked and the tape held by the take-up and catch hold the two members solidly as a single piece to be used in measuring angles—as, for instance, that between the window sill and stop.

50 designates an arm pivoted by a rivet 51 to the member *b* and held frictionally tight in said member to constitute with the members *a* and *b* when the same are locked together a try-bevel with which to measure the angle between two adjacent surfaces—such, for instance, as the stop 52 and the sill 53 of a window.

In practical use to measure the distance between two sides of an opening or between any other points the operator will grasp the members *a b* in the two hands, respectively, and by pressure of the two thumb-pieces *s y* will simultaneously release the tape *c* and the locking-arm *w* and will then move the members apart and will bring them against the points or the surfaces the distance between which is to be measured. If said surfaces are parallel to each other, the external ends *g* and *h* will be firmly placed against said parallel surfaces and then the thumb-piece will be released, thus allowing the spring *q* to actuate the catch *p* to press the tape *c* against the portion *r* which forms one side of a tapeway through the member *a*, thereby fixing the tape with relation to the member *a*, whereupon the distance measured may be noted. When this is done, the thumb-pieces *s* and *y* will again be pressed in, thus releasing the tape and allowing it to be drawn in by *d* and also allowing the locking-arm *u* to enter the socket *x*, whereupon the thumb-pieces *s* and *y* will be released and the device will be a smooth-sided body ready to be placed in the pocket. To use the device as a try-bevel, the arm 50 will be drawn out by means of the thumb or finger nail or any instrument inserted in the notch 54 in the member *b* for that purpose.

The take-up device *d* may be of any suitable character.

55 designates a spiral spring around the pivot 51 and pressing on the arm 50 to hold the same friction-tight, so that it may be used.

The device may be variously constructed without departing from the principle of this invention.

In the form shown in Fig. IV a part $u'$ on the member $a'$ fits into a socket $x'$ in the member $b'$ and is held by a latch $w'$, having a thumb-piece $y'$, the construction being somewhat different from that shown in Figs. II and III, but serving a like purpose, without the use of the tenon $u^2$, (shown in Figs. I and II,) which fits in a socket $x^2$ in the part *a* to hold the members from twisting upon each other when locked together.

In Fig. VII, 60 and 61 designate two bodies the space between which is being measured.

In both constructions when the device is not in use there are no external latches liable to catch in the lining of the pocket, and thereby tear the pocket or become accidentally unfastened. The internal locking devices, which have been described, although manually accessible, are normally substantially concealed.

I do not limit the device to the use of the particular form of take-up shown, in which the spring take-up ordinarily used in tape-measures is shown, this being at present regarded as the most desirable.

Having described my invention, I claim as new and desire to secure by Letters Patent of the United States—

1. A device for measuring openings comprising two rectangular members and a measuring-tape which connects said members which are constructed with corresponding faces to fit together to form a unitary rectangular body and extends between said faces and is controlled by a take-up device in one of said members and which tape is marked with a numbered scale the numbers on which are arranged with reference to the member which is provided with the take-up device, to exhibit at such last-named member, the number of the scale which designates the length of the space between the external ends of the members when the same are drawn apart.

2. A device for measuring openings comprising two rectangular members and a measuring-tape which connects said members which are constructed with corresponding faces to fit together to form a unitary rectangular body and extends between said faces and is controlled by a take-up device in one of the members and which is marked with a numbered scale the numbers on which are arranged with reference to the member which is provided with said take-up device, to exhibit at such last-named member, the number of the scale which designates the length of the space between the external ends of the members; said take-up device for controlling said tape; and a catch for stopping the tape.

3. In a device for measuring openings, the combination of two rectangular members which are constructed with corresponding faces to fit together to form a unitary rectangular body; a manually-releasable catch within said body adapted to lock the members together; a measuring-tape which connects said members and is furnished with a scale; a take-up device in one of said members for controlling said tape; and a catch for stopping said tape with relation to the member which has the take-up device.

4. The combination of two rectangular members which are constructed with corresponding faces to fit together to form a unitary rectangular body; a manually-releasable catch within said body adapted to lock the members together; a measuring-tape which connects said members and extends between said faces and is furnished with a scale; a take-up device in one of said members for controlling the measuring device; a spring-actuated catch for stopping said tape with relation to the member which has the take-up device.

5. The combination of two rectangular members which are constructed with corresponding faces to fit together to form a unitary rectangular body; a tape which connects said members and extends between said faces and is furnished with a scale; a take-up device in one of said members for controlling the tape; a catch to stop the tape; and internal means for locking said members together.

6. A device for measuring openings comprising two members; a tape connecting said members and arranged at one edge thereof; a take-up in one of said members for controlling said tape; a catch for stopping said tape, means at the other edge of the members for locking the members together and an arm pivoted to one of said members and arranged in connection with said members to form a device for measuring the angle between two surfaces.

7. In a measuring device, in combination, a tape, a member to which one end of said tape is attached, a tape-holding member, a take-up device in said tape-holding member, a concealed latch whereby said members may be fastened together into a smooth-sided body, and a numbered scale on the tape adapted to indicate the distance between the external ends of the members when the same are drawn apart.

8. The combination of two members one of which is furnished with a socket and the other with a part to enter said socket; a tape connecting said members; a take-up in one of said members for controlling the tape; a catch for stopping the tape; a catch for locking said part in said socket; and resilient means for holding said catches in catching position.

9. The combination of a member; a tape extending from said member; a take-up for controlling said tape; a catch for stopping said tape; another member to which the tape is connected; a latch for locking the members together, and a spring between said catch and latch for holding them in operating position.

10. In a measuring device, in combination, a member provided with a tapeway, a tape extending through said way, a take-up device in said member, a device having a manually-accessible portion at one side of the tape and a part in fixed relation to said portion and projecting into the tapeway on the other side of the tape said device being movable transversely to said tapeway, and a spring normally holding the tape friction-tight against a side of the tapeway by pressing said part against the tape.

11. In a measuring device, in combination, a tape-holding member, a tape adapted to play therethrough, a take-up device in said member, a rigid member having inner and outer arms embracing the tape together with a portion of the tape-holding member, and a spring normally pressing the inner arm against the tape, said rigid member being movable inwardly against the pressure of the spring to release the tape.

12. In a measuring device, in combination, a tape, a member to which one end of said tape is made fast, a tape-holding member, a take-up device in the tape-holding member, and a numbered scale on the tape, said scale numbered to indicate the distance between the external ends of the members when the same are drawn apart.

13. In a measuring device, in combination, a tape, a member to which one end of said tape is made fast, a tape-holding member, a take-up device in the tape-holding member, and a numbered scale on the tape, said scale numbered to indicate the distance between the external ends of the members when the same are drawn apart, said external ends each respectively provided with a flat surface adapted to abut against a wall.

14. In a measuring device, in combination, a tape, a tape-holding member provided with a take-up device, a member to which the outer end of the tape is attached, a catch at one side of the tape-holding member and normally engaging the tape, and a latch opposite said catch and at the other side of the tape-holding member adapted to lock the two members together, said catches operating toward and from each other and both manually accessible.

In testimony whereof I have signed my name to this specification, in the presence of two subscribing witnesses, at Los Angeles, California, this 13th day of March, 1902.

HERBERT C. PARKER

Witnesses:
JAMES R. TOWNSEND,
H. H. KERCKHOFF.